US012645701B1

(12) United States Patent
Jamloki et al.

(10) Patent No.: US 12,645,701 B1
(45) Date of Patent: Jun. 2, 2026

(54) DATABASE REPLICATION ASSOCIATED WITH LONG RUNNING TRANSACTIONS

(71) Applicant: INTERNATIONAL BUSINESS MACHINES CORPORATION, Armonk, NY (US)

(72) Inventors: Shailesh Chandra Jamloki, Noida (IN); Jitendra Kumar Panda, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/051,430

(22) Filed: Feb. 12, 2025

(51) Int. Cl.
|  |  |
|---|---|
| *G06F 17/00* | (2019.01) |
| *G06F 16/23* | (2019.01) |
| *G06F 16/27* | (2019.01) |

(52) U.S. Cl.
CPC ........ *G06F 16/273* (2019.01); *G06F 16/2379* (2019.01)

(58) Field of Classification Search
CPC ........................... G06F 16/273; G06F 16/2379
See application file for complete search history.

(56) References Cited

U.S. PATENT DOCUMENTS

| | | | |
|---|---|---|---|
| 9,244,776 B2 | 1/2016 | Koza et al. | |
| 11,176,171 B2 * | 11/2021 | Brodt ................. | G06F 16/2358 |
| 11,397,749 B2 | 7/2022 | Kumar et al. | |
| 11,630,814 B2 | 4/2023 | Butterstein et al. | |

| | | | |
|---|---|---|---|
| 11,893,041 B2 | 2/2024 | Stolze et al. | |
| 2017/0255528 A1 | 9/2017 | Kedia et al. | |
| 2018/0046551 A1 * | 2/2018 | Bourbonnais ....... | G06F 16/2379 |
| 2020/0320059 A1 | 10/2020 | Kumar et al. | |
| 2021/0165810 A1 * | 6/2021 | Yang ................... | G06F 16/2315 |
| 2022/0027338 A1 * | 1/2022 | Jo ......................... | G06F 16/214 |
| 2022/0188278 A1 | 6/2022 | Butterstein et al. | |
| 2024/0346045 A1 * | 10/2024 | Sheelvant ........... | G06F 11/1451 |

OTHER PUBLICATIONS

Adaptive apply—IBM Documentation, https://www.ibm.com/docs/en/iirfz/11.3.0?topic=processing-adaptive-apply, Jan. 18, 2024, 05 pages.

(Continued)

*Primary Examiner* — Greta L Robinson
(74) *Attorney, Agent, or Firm* — Seed Intellectual Property Law Group LLP

(57) ABSTRACT

A method, system, and computer program product configured to perform operations including: detecting, using a first thread associated with a first change data capture (CDC) replication mode, that a database transaction associated with a source database exceeds a threshold time value; based on the detecting, spawning a second thread that is configured to identify log entries associated with the database transaction; confirming the database transaction qualifies as a long transaction based on a commit operation in the log entries associated with the database transaction; based on the confirming, switching to a second replication mode for a table associated with the database transaction; updating the table in a target database using values obtained by executing queries on the source database; and based on the updating the table in the target database, terminating the second thread and switching back to the first CDC replication mode for the table.

20 Claims, 5 Drawing Sheets

(56) References Cited

OTHER PUBLICATIONS

Authors et al., "A Method to handle replication for large transaction", IP.com No. IPCOM000266068D, Jun. 10, 2021, 02 pages.

Authors et al., "Dynamic policy based latency management in relational database replication system for differentiated quality of service (QoS)", An IP.com Prior Art Database Technical Disclosure, IP.com No. IPCOM000169390D, Apr. 14, 2008, 11 pages.

Authors et al., "Dynamically Adjust Database Replication Rate According to a Large Amount of Incoming Data", IP.com No. IPCOM000269742D, May 10, 2022, 05 pages.

Authors et al., "System and Method for Granular View of Transactions for each Table in RDBMS for Enabling Replication performance improvement and proper Repository sizing for long running transactions", IP.com No. IPCOM000256870D, Jan. 7, 2019, 03 pages.

Mapping using Adaptive Apply—IBM Documentation, https://www.ibm.com/docs/zh-tw/idr/11.3.3?topic=tables-mapping-using-adaptive-apply, Oct. 9, 2024, 03 pages.

Muhe et al., "Executing Long-Running Transactions in Synchronization-Free Main Memory Database Systems", Conference on Innovative Data Systems Research, 2013, 12 pages.

Singla Virender, "Postgres—Logical Replication and long running transactions", Medium, Dec. 16, 2021, 16 pages.

* cited by examiner

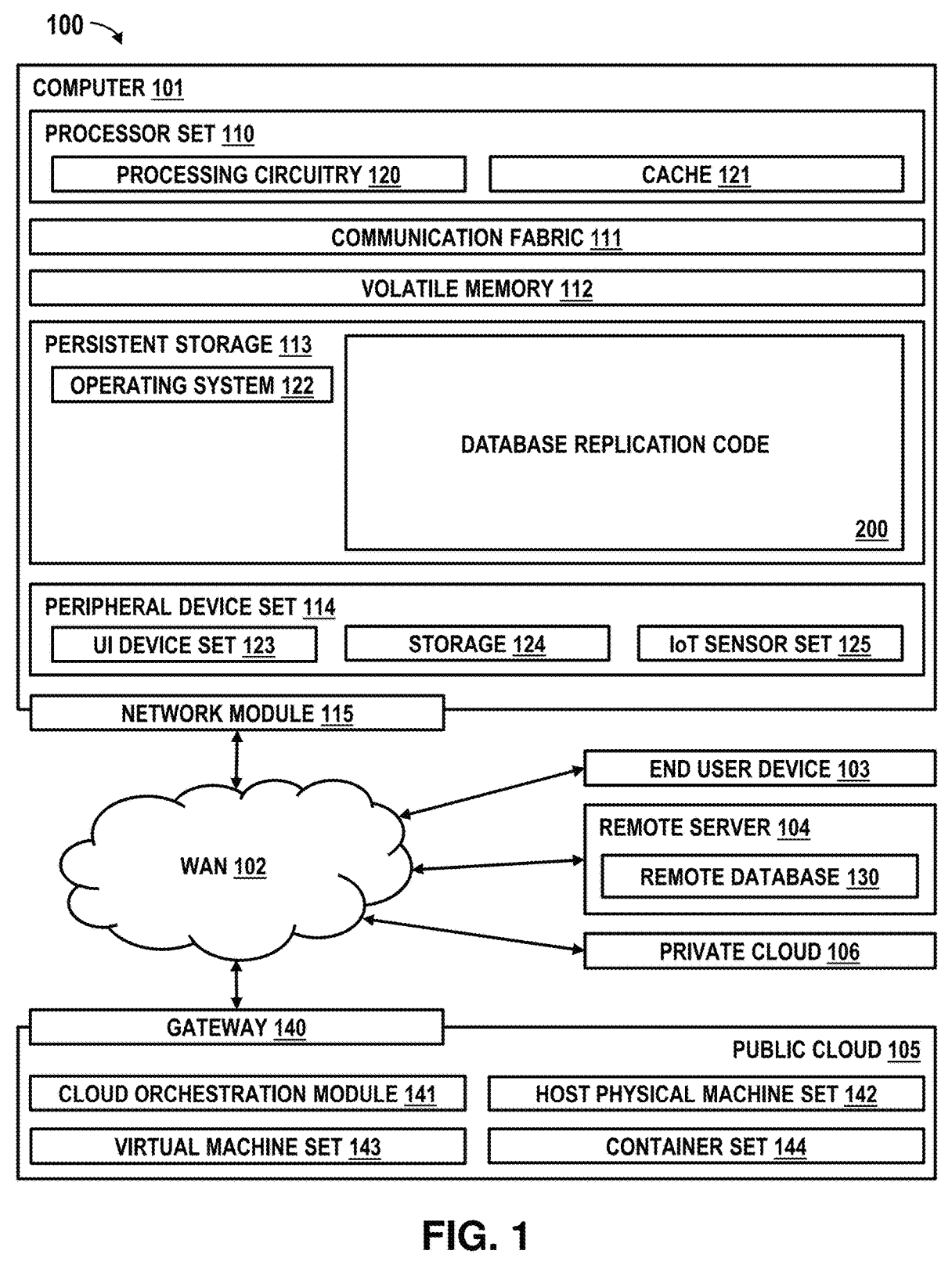

100 ⬎

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

DATABASE REPLICATION CODE

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

FIG. 1

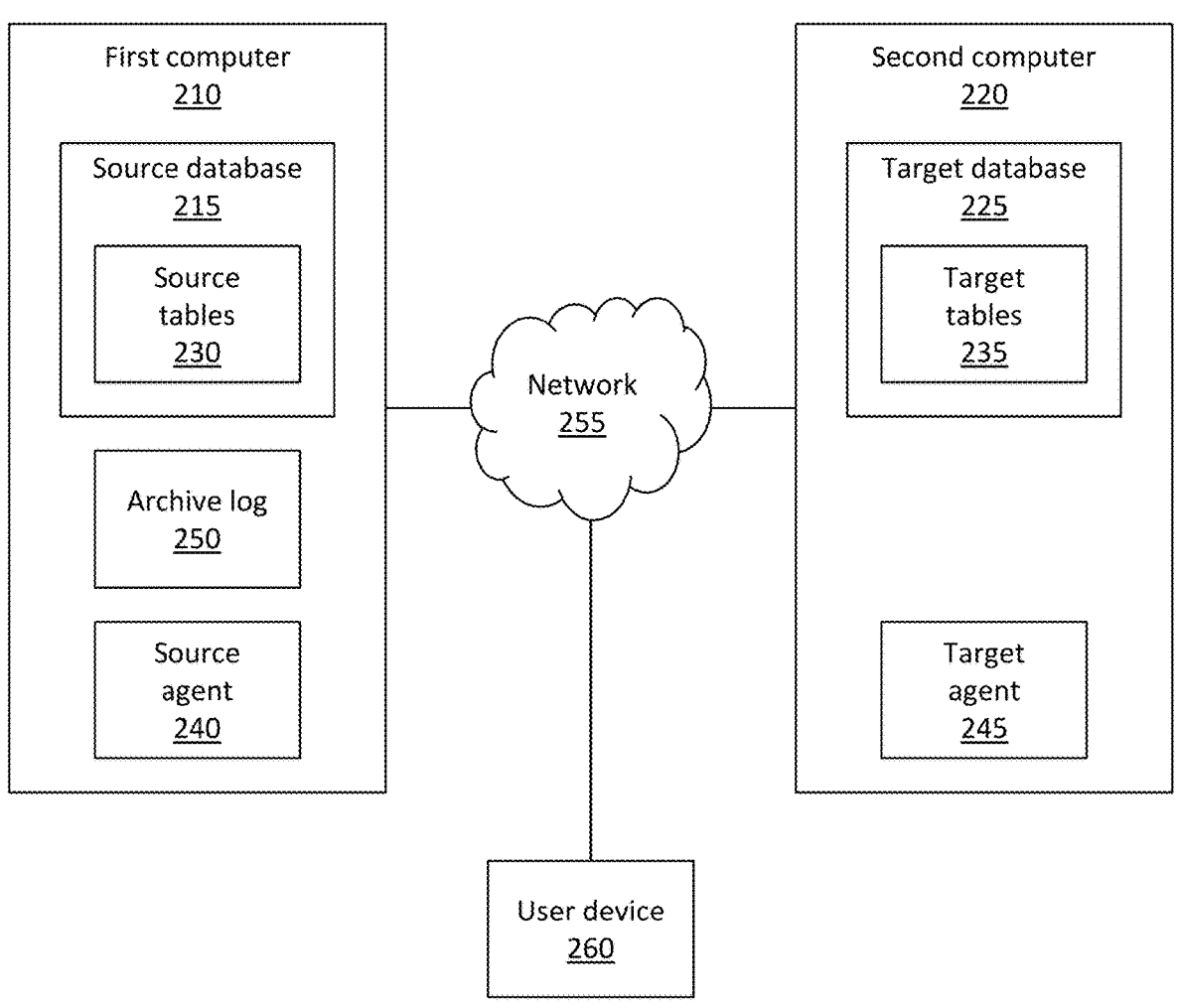
FIG. 2

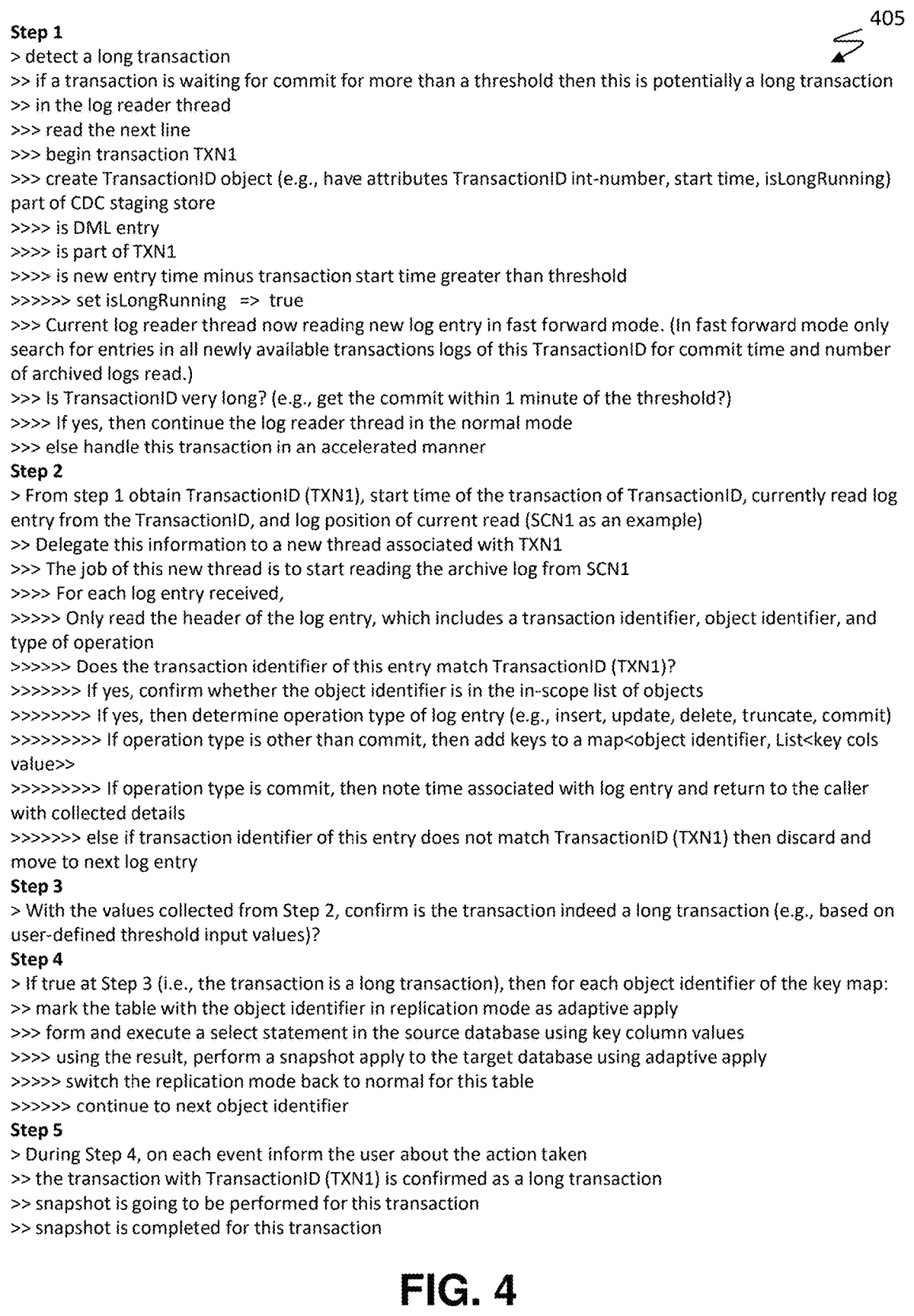

405

Step 1
> detect a long transaction
>> if a transaction is waiting for commit for more than a threshold then this is potentially a long transaction
>> in the log reader thread
>>> read the next line
>>> begin transaction TXN1
>>> create TransactionID object (e.g., have attributes TransactionID int-number, start time, isLongRunning) part of CDC staging store
>>>> is DML entry
>>>> is part of TXN1
>>>> is new entry time minus transaction start time greater than threshold
>>>>>> set isLongRunning  =>  true
>>> Current log reader thread now reading new log entry in fast forward mode. (In fast forward mode only search for entries in all newly available transactions logs of this TransactionID for commit time and number of archived logs read.)
>>> Is TransactionID very long? (e.g., get the commit within 1 minute of the threshold?)
>>>> If yes, then continue the log reader thread in the normal mode
>>> else handle this transaction in an accelerated manner
Step 2
> From step 1 obtain TransactionID (TXN1), start time of the transaction of TransactionID, currently read log entry from the TransactionID, and log position of current read (SCN1 as an example)
>> Delegate this information to a new thread associated with TXN1
>>> The job of this new thread is to start reading the archive log from SCN1
>>>> For each log entry received,
>>>>> Only read the header of the log entry, which includes a transaction identifier, object identifier, and type of operation
>>>>>> Does the transaction identifier of this entry match TransactionID (TXN1)?
>>>>>>> If yes, confirm whether the object identifier is in the in-scope list of objects
>>>>>>>> If yes, then determine operation type of log entry (e.g., insert, update, delete, truncate, commit)
>>>>>>>>> If operation type is other than commit, then add keys to a map<object identifier, List<key cols value>>
>>>>>>>>> If operation type is commit, then note time associated with log entry and return to the caller with collected details
>>>>>>> else if transaction identifier of this entry does not match TransactionID (TXN1) then discard and move to next log entry
Step 3
> With the values collected from Step 2, confirm is the transaction indeed a long transaction (e.g., based on user-defined threshold input values)?
Step 4
> If true at Step 3 (i.e., the transaction is a long transaction), then for each object identifier of the key map:
>> mark the table with the object identifier in replication mode as adaptive apply
>>> form and execute a select statement in the source database using key column values
>>>> using the result, perform a snapshot apply to the target database using adaptive apply
>>>>> switch the replication mode back to normal for this table
>>>>>> continue to next object identifier
Step 5
> During Step 4, on each event inform the user about the action taken
>> the transaction with TransactionID (TXN1) is confirmed as a long transaction
>> snapshot is going to be performed for this transaction
>> snapshot is completed for this transaction

FIG. 4

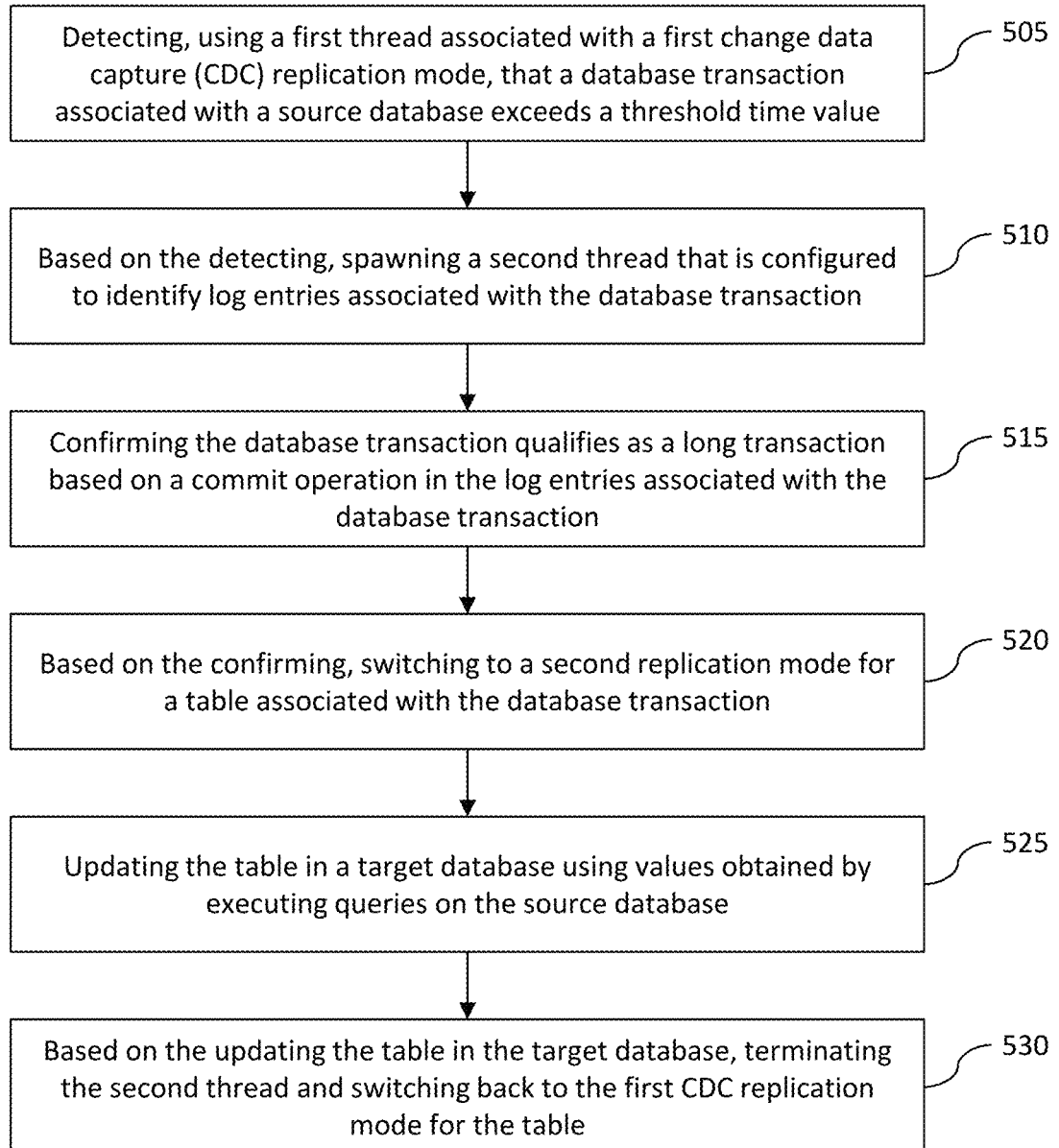

Detecting, using a first thread associated with a first change data capture (CDC) replication mode, that a database transaction associated with a source database exceeds a threshold time value — 505

Based on the detecting, spawning a second thread that is configured to identify log entries associated with the database transaction — 510

Confirming the database transaction qualifies as a long transaction based on a commit operation in the log entries associated with the database transaction — 515

Based on the confirming, switching to a second replication mode for a table associated with the database transaction — 520

Updating the table in a target database using values obtained by executing queries on the source database — 525

Based on the updating the table in the target database, terminating the second thread and switching back to the first CDC replication mode for the table — 530

FIG. 5

DATABASE REPLICATION ASSOCIATED WITH LONG RUNNING TRANSACTIONS

BACKGROUND

Aspects of the present invention relate generally to the field of computer database management, and more specifically, to data replication between a source database and target database.

Most modern-day database systems employ database replication to ensure that critical databases provide redundancy to protect against the loss of data and to maintain the accessibility of the database. Database replication is the frequent copying of data from one database on one computer or server to another database on another computer or server. Database replication ensures that the failure of the computer or server will not result in the loss of the data stored in the database or a loss of accessibility to the database.

Many systems exist for replicating data from one database to another. These systems can be classified into two categories: full refresh systems that copy entire data sets and change data capture (CDC) systems that optimize transfers by applying changes only. CDC systems enable a change data capture service in which only changed data in a source database is updated in a target database.

SUMMARY

In a first aspect of the invention, there is a method including: detecting, using a first thread associated with a first change data capture (CDC) replication mode, that a database transaction associated with a source database exceeds a threshold time value; based on the detecting, spawning a second thread that is configured to identify log entries associated with the database transaction; confirming the database transaction qualifies as a long transaction based on a commit operation in the log entries associated with the database transaction; based on the confirming, switching to a second replication mode for a table associated with the database transaction; updating the table in a target database using values obtained by executing queries on the source database, the values being identified based on operations in the log entries associated with the database transaction; and, based on the updating the table in the target database, terminating the second thread and switching back to the first CDC replication mode for the table.

In another aspect of the invention, there is a computer program product comprising one or more computer-readable storage media and program instructions stored on the one or more computer-readable storage media to perform operations comprising: detecting, using a first thread associated with a first change data capture (CDC) replication mode, that a database transaction associated with a source database exceeds a threshold time value; based on the detecting, spawning a second thread that is configured to identify log entries associated with the database transaction; confirming the database transaction qualifies as a long transaction based on a commit operation in the log entries associated with the database transaction; based on the confirming, switching to a second replication mode for a table associated with the database transaction; updating the table in a target database using values obtained by executing queries on the source database, the values being identified based on operations in the log entries associated with the database transaction; and, based on the updating the table in the target database, terminating the second thread and switching back to the first CDC replication mode for the table.

In another aspect of the invention, there is a computer system comprising a processor set, one or more computer-readable storage media, and program instructions stored on the one or more computer-readable storage media to cause the processor set to perform operations comprising: detecting, using a first thread associated with a first change data capture (CDC) replication mode, that a database transaction associated with a source database exceeds a threshold time value; based on the detecting, spawning a second thread that is configured to identify log entries associated with the database transaction; confirming the database transaction qualifies as a long transaction based on a commit operation in the log entries associated with the database transaction; based on the confirming, switching to a second replication mode for a table associated with the database transaction; updating the table in a target database using values obtained by executing queries on the source database, the values being identified based on operations in the log entries associated with the database transaction; and, based on the updating the table in the target database, terminating the second thread and switching back to the first CDC replication mode for the table.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 2 shows a block diagram of an exemplary environment in accordance with aspects of the present invention.

FIG. 4 shows pseudocode defining logical operations of an exemplary method in accordance with aspects of the invention.

FIG. 5 shows a flowchart of an exemplary method in accordance with aspects of the present invention.

DETAILED DESCRIPTION

Figure 3:
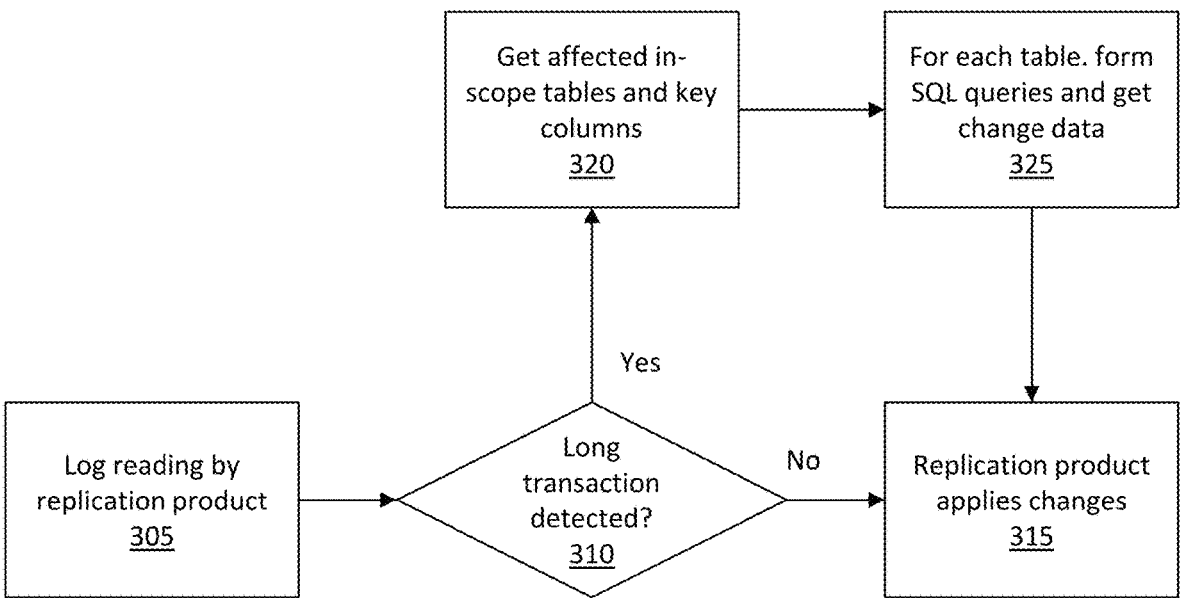
FIG. 3 shows a flowchart of an exemplary method in accordance with aspects of the present invention.

Aspects of the present invention relate generally to the field of computer database management, and more specifically, to data replication between a source database and target database. Data replication, including CDC, provides trusted data synchronization between a source database and one or more target databases. In this way, the target database is a duplicate of the source database. If the source computer, source database, or network fails, the target database may act as the source database.

CDC data replication products determine changes to the source database by reading entries in an archive log instead of querying the source database itself. Determining changes based on the archive log instead of accessing the source database avoids extra load to the source database that might slow down business processes for which the source database is utilized. The archive log includes entries associated with transactions that occur at the source database. The archive log may be arranged like a book, with pages, lines, and sentences. An agent at the source database (also called source agent) reads the entries of the archive log to determine changes to data in the source database and communicates these changes to an agent at the target database (also called a target agent). The target agent causes the changes to be made to the target database and maintains a bookmark that records a position in the archive log corresponding to the commit point of the last committed transaction on the target database. In this manner, the bookmark indicates a stable save point in the archive log to which the target database has been updated. If a failure of the replication product occurs, then the bookmark is used to determine the point from which to start reading the archive log again.

In conventional CDC data replication products, the source agent sends change data for a transaction to the target agent only after encountering a commit operation for the transaction in the archive log. Entries in the archive log are marked as read based on receiving confirmation that changes associated with the transaction were made at the target database, and the bookmark is based on the position of the oldest unread entry. This behavior can cause a problem when handling large transactions and/or long transactions. Large transactions are those transactions that have relatively large burst of data activity at the source database and that generate relatively large amounts of archive logs in a relatively short amount of time. Long transactions (also called long running transactions) are those transactions that involve a relatively long amount of time between the start of the transaction and a commit of the transaction. A long transaction for which the source agent has not reached the commit in the archive log causes the target agent's bookmark to remain at position far back in the archive log, even though many other transactions may have been committed and their changes applied to the target database in the interim. The bookmark being further back in the archive log due to a long transaction increases the amount of entries that must be re-read from the archive log and re-applied to the target database in the event of a failure and restart. This inefficient handling of long transactions thus represents a problem in conventional CDC data replication products.

Implementations of the invention address this problem by detecting a long transaction during CDC data replication and intelligently performing a parallel snapshot to the target database based on a transaction identifier associated with the long transaction and in adaptive apply mode. In embodiments, when a replication system operating in normal apply mode detects a long transaction before encountering a commit of the long transaction, the system spawns a thread that analyzes the archive log to identify operations associated with the long transaction based on a transaction identifier. The system then queries the source database to determine changes associated with these identified operations and updates the target database with these changes for example by using a snapshot operation for these changes only. In embodiments, the update to the target database is made using adaptive apply mode, and the system returns to the normal apply mode after making these changes to the target database. The entries associated with the long transaction may be marked as read in the archive log, meaning that the bookmark may be moved to a point in the archive log after the start of the long transaction. This decreases the number of entries that must be re-read from the archive log and re-applied to the target database during a recovery that results from a failure and restart, which reduces an amount of time that the database in unavailable during the recovery from this particular failure situation. In this manner, embodiments provide an improvement in the field of computer database management by reducing an amount of time that the database in unavailable during a recovery from a failure.

Implementations of the invention are necessarily rooted in computer technology. For example, operations such as spawning a computer processing thread, generating and executing database queries, and updating a database using a snapshot process are inherently computer-based and cannot be performed in the human mind or using pen and paper.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as database replication code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

FIG. 2 shows a block diagram of an exemplary environment 205 in accordance with aspects of the invention. In embodiments, the environment 205 includes a data process- ing system that includes a first computer 210 hosting a source database 215 and a second computer 220 hosting a target database 225. In one example, each of the first computer 210 and the second computer 220 comprises one or more instances of the computer 101 of FIG. 1. In another example, each of the first computer 210 and the second computer 220 comprises one or more virtual machines or one or more containers running on one or more instances of the computer 101 of FIG. 1. In various embodiments, the source database 215 comprises a first relational database including a plurality of source tables 230, and the target database 225 comprises a second relational database includ- ing a plurality of target tables 235.

In accordance with aspects of the invention, the data processing system uses CDC replication to replicate data in the source database 215 to the target database 225. In embodiments, the first computer 210 runs a source agent 240 that operates as a CDC agent for the source database 215, and the second computer 220 runs a target agent 245 that operates as a CDC agent for the target database 225. In various examples, the source agent 240 reads an archive log 250 that contains entries associated with transactions that occur at the source database 215, determines changes to the source tables 230 based on the entries in the archive log 250, and communicates these changes to the target agent 245. In various examples, the target agent 245 updates the target tables 235 based on the changes received from the source agent and maintains a bookmark that records a position in the archive log 250 corresponding to the commit point of the last committed transaction on the target database 225. In various examples, the target agent 245 communicates to the source agent 240 which changes have been applied to the target database 225 and the source agent 240 marks as read the entries in the archive log 250 that are associated with these changes. Communication between the source agent 240 and the target agent 245 may be made via network 255 that provides communication between the first computer 210 and the second computer 220. In embodiments, the network 255 comprises one or more networks for communicating computer data, such as the WAN 102 of FIG. 1.

With continued reference to FIG. 2, the environment 205 may further comprise a user device 260 that communicates with the data processing system via the network 255. The user device 260 may comprise one or more instances of the EUD 103 of FIG. 1.

In embodiments, the source agent 240 and the target agent 245 are part of a replication product that provides CDC data replication of the source database 215 to the target database 225. For example, each of the source agent 240 and the target agent 245 may comprise modules of the code of block 200 of FIG. 1. Such modules may include routines, pro- grams, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The data processing system may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or dif- ferently arranged devices and/or networks than illustrated in FIG. 2.

FIG. 3 shows a flowchart of an exemplary method in accordance with aspects of the present invention. Steps of the method (also referred to as operations) may be carried out in the environment of FIG. 2 and are described with reference to elements depicted in FIG. 2.

At step 305 the replication product reads entries in the archive log associated with a source database. In embodi- ments, step 305 comprises the source agent 240 reading entries in the archive log 250, e.g., by running a log reader thread that performs a shared scrape process to identify changes in the source tables 230 based on entries in the archive log 250.

At step 310 the replication product determines whether a long transaction is detected. In embodiments, step 310 comprises the source agent 240 detecting a long transaction in the archive log based on reading entries in the archive log 250. The source agent 240 may detect a long transaction by comparing a time of a transaction, prior to encountering a commit for the transaction, to a predefined threshold. The predefined threshold may be a user configurable value that a user defines via input to the user device 260.

In the event a long transaction is not detected at step 310, then at step 315 the replication product applies changes to the target database in a normal apply mode. In embodiments, the normal apply mode involves the target agent 240 receiv- ing an indication of changes to source tables 230 that were identified in the shared scrape process performed by the source agent 240 and making corresponding changes to the target tables 235.

In the event a long transaction is detected at step 310, then at step 320 the replication product determines the affected in-scope tables in the source tables and key columns in the affected in-scope tables. In embodiments, the source agent 240 spawns a new thread (referred to herein as an acceler- ated log scanner thread) that is configured to run as part of a private scrape process for the detected long transaction.

At step 325, for each table identified at step 320, the replication product forms and executes a query to obtain changed data associated with the long transaction. In embodiments, the source agent 240 generates one or more structured query language (SQL) queries based on the key columns of the affected in-scope tables. In embodiments, the source agent 240 executes the one or more SQL queries on the source database 215 to determine changes to one or more of the source tables 230 associated with the long transaction.

Following step 325, the replication product applies the changes determined using the SQL queries to the target database using adaptive apply mode. In embodiments, the target agent 245 updates target tables 235 in the target database 225 with these changes using a snapshot operation for these changes only. In embodiments, the update to the target database 225 is made using adaptive apply mode, and the system returns to the normal apply mode at step 315 after making these changes using adaptive apply mode.

In accordance with aspects of the invention, a log reader thread that currently identifies long transactions is enhanced to collect additional details of each detected long transac- tion. The additional details may include the complete trans- action prefix identifier, start time of transaction, and parsed details about the table/key that the transaction is updating/ inserting (e.g., object identifiers and keys of those object identifiers). In embodiments, for a detected long transaction, the source agent creates a new thread that keeps scraping the log files of the archive log until the transaction completes, e.g., meaning the commit for the transaction is encountered in the log files. This scraping includes identifying the log entries in the log files that have a transaction identifier that matches the transaction identifier of the long transaction and, from each such identified log entry, obtaining the details of table/key updating/inserting. The replication product uses the table/key details that are gathered in this manner to perform an adaptive apply to the appropriate target tables in the target database. In embodiments, the threads reading the log files are synchronized in order to avoid input/output (I/O) congestion. It is highly unlikely that multiple long transactions will be detected at a same time, and so it is equally unlikely that multiple such new threads would be spawned together and create synchronization delay. As such, the I/O congestion avoidance most likely only comes into play at the time of spawning the new thread and for a minimal time as the new thread operates in an accelerated manner to read the log files of the archive log. In additional embodiments, the system may introduce a control character, which is not part of the database data, as a terminator after a transaction log.

In accordance with aspects of the invention, based on the log reader thread detecting a long transactions, the source agent spawns the new thread that is referred to herein as the accelerated log scanner thread. In embodiments, the log reader thread hands over the collected additional details of the long transaction to the accelerated log scanner thread, and the log reader thread is paused (e.g., suspended) until notified by the accelerated log scanner thread. In embodiments, the accelerated log scanner thread pattern matches the current log file with the transaction identifier of the long transaction and moves all the matching log entries to a separate data structure. The accelerated log scanner thread then notifies the log reader thread that it (i.e., the log reader thread) is permitted to continue its normal shared scraping of the log files in the log archive, which resumes without considering the entries associated with the long transaction since these have been moved to the separate data structure. The accelerated log scanner thread then parses the filtered log entries that are in the separate data structure to obtain the details (e.g., table identifiers and key values from payload) for adaptive apply, and progresses with adaptive apply for the associated changes.

FIG. 4 shows pseudocode 405 defining logical operations of an exemplary method in accordance with aspects of the invention. Steps of the pseudocode 405 may be carried out in the environment of FIG. 2 and are described with reference to elements depicted in FIG. 2. Steps of the pseudocode 405 may be carried out in performing steps of the method of FIG. 3.

Step 1 of the pseudocode 405 involves a log reader thread of the replication product detecting a possible long transaction while operating in a first (e.g., normal) CDC replication mode. As described herein, the user may define a threshold (e.g., 30 minutes) for detecting a long transaction, and that threshold may be used to detect a possible long transaction. In various examples, while the log reader thread of the replication product is running and reading the archive log 250, the log reader thread begins a timer for each new transaction encountered in the log files. If the log reader thread does not encounter a commit for a particular transaction within the user-defined threshold time, then the log reader thread marks this particular transaction as a possible long transaction.

Step 2 of the pseudocode 405 involves the source agent 240 spawning a new thread referred to herein as the accelerated log scanner thread, which is configured to run in a fast-forward mode to swiftly review every archived log in order to determine the number of archive logs this transaction is spread across. In various embodiments, the accelerated log scanner thread reads a subset of the data from log entries associated with the possible long transaction based on the transaction identifier of the possible long transaction, the subset of the data including the header of the log entry, which includes a transaction identifier of the log entry, an object identifier of the log entry, and an operation type of the log entry. In embodiments, the accelerated log scanner thread reads the log entries to discover a commit operation associated with the possible long transaction.

Step 3 of the pseudocode 405 involves the source agent 240 confirming that the possible long transaction is indeed a long transaction based on, for example, the start time of the possible long transaction, the time of the commit operation of the possible long transaction (from step 2), and the user-defined threshold time. In one example, if the time of the commit operation minus the start time exceeds the user-defined threshold time, then this transaction is confirmed as a long transaction. In accordance with aspects of the invention, in response to confirming that the possible long transaction is a long transaction, the replication product switches to adaptive apply mode for tables associated with the long transaction based on information obtained at step 2. adaptive apply processing (also called an adaptive apply strategy or adaptive apply mode), is a technique for producing consistent data when parts of the data have already been replicated to the target database. For example, when source and target tables are not synchronized, but a user wants to replicate data from the source to the target without error, then the user may map the source table to the target table using adaptive apply mode. In one non-limiting example, if there is an insert on the source table but that row already exists in the target table, then CDC replication using adaptive apply mode switches the insert to an update operation. In another non-limiting example, if there is an update on the source table and this row does not exist on the target table, then CDC replication using adaptive apply mode changes the update into an insert.

Step 4 of the pseudocode 405 involves the source agent 240 forming and executing SQL queries to the source database based on the data collected at step 2 from the log entries associated with the long transaction. In embodiments, the source agent 240 gets the key column values from data manipulation language (DML) entries from the CDC metadata of the in-scope tables that will be snapshot applied to the target database. In embodiments, this process removes dependency of the long transaction from log reading and instead builds the changed data from queries to the source database 215 for the rows where key column values are available for one of the source tables 230. In embodiments, the target agent 245 applied changes row by row for respective ones of the target tables 235 based on the snapshot change data received from the source agent and then moves to a next table until all the target tables 235 involved in the long transaction are updated using adaptive apply mode. After updating the appropriate ones of the target tables 235 associated with the long transaction, the replication product switches back to the normal apply mode and terminates the accelerated log scanner thread for this particular long transaction.

Step 5 of the pseudocode 405 involves the replication product notifying the user of actions taken with respect to the long transaction, such as: notifying the user that a transaction has been detected and confirmed as a long transaction; notifying the user that a snapshot is going to be performed for this transaction; and notifying the user after the snapshot is completed for this transaction. The notifications may be communicated to the user device 260.

FIG. 5 shows a flowchart of an exemplary method in accordance with aspects of the present invention. Steps of the method (also referred to as operations) may be carried out in the environment of FIG. 2 and are described with reference to elements depicted in FIG. 2. Steps of the method may be carried out using logic illustrated by the pseudocode 405 of FIG. 4.

Step 505 includes detecting, using a first thread associated with a first change data capture (CDC) replication mode, that a database transaction associated with a source database exceeds a threshold time value. Step 510 includes, based on the detecting, spawning a second thread that is configured to identify log entries associated with the database transaction. Step 515 includes confirming the database transaction qualifies as a long transaction based on a commit operation in the log entries associated with the database transaction. Step 520 includes, based on the confirming, switching to a second replication mode for a table associated with the database transaction. Step 525 includes updating the table in a target database using values obtained by executing queries on the source database, the values being identified based on operations in the log entries associated with the database transaction. Step 530 includes, based on the updating the table in the target database, terminating the second thread and switching back to the first CDC replication mode for the table.

In embodiments of the method of FIG. 5, the first CDC replication mode is a normal apply mode and the second replication mode is an adaptive apply mode.

In embodiments of the method of FIG. 5, the first thread is a log reader thread configured to run as part of a shared scrape process for plural database transactions, and the second thread is an accelerated log scanner thread configured to run as part of a private scrape process for the database transaction that is one of the plural database transactions.

In embodiments of the method of FIG. 5, the second thread is configured to identify the log entries associated with the database transaction based on a transaction identifier included in the log entries.

In embodiments of the method of FIG. 5, the method further comprises forming the queries based on key column values determined from the log entries associated with the database transaction.

In embodiments of the method of FIG. 5, the updating the table in the target database comprises performing a snapshot apply to the target database using adaptive apply.

In embodiments of the method of FIG. 5, the method further comprises notifying a user that the database transaction qualifies as a long transaction based on the confirming.

In embodiments of the method of FIG. 5, the method further comprises notifying the user that the table in the target database has been updated based on the database transaction.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

detecting, using a first thread associated with a first change data capture (CDC) replication mode, that a database transaction associated with a source database exceeds a threshold time value;

based on the detecting, spawning a second thread that is configured to identify log entries associated with the database transaction;

confirming the database transaction qualifies as a long transaction based on a commit operation in the log entries associated with the database transaction;

based on the confirming, switching to a second replication mode for a table associated with the database transaction;

updating the table in a target database using values obtained by executing queries on the source database, the values being identified based on operations in the log entries associated with the database transaction; and based on the updating the table in the target database, terminating the second thread and switching back to the first CDC replication mode for the table.

2. The method of claim 1, wherein:

the first CDC replication mode is a normal apply mode; and the second replication mode is an adaptive apply mode.

3. The method of claim 1, wherein:

the first thread is a log reader thread configured to run as part of a shared scrape process for plural database transactions; and the second thread is an accelerated log scanner thread configured to run as part of a private scrape process for the database transaction that is one of the plural database transactions.

4. The method of claim 1, wherein the second thread is configured to identify the log entries associated with the database transaction based on a transaction identifier included in the log entries.

5. The method of claim 1, further comprising forming the queries based on key column values determined from the log entries associated with the database transaction.

6. The method of claim 1, wherein the updating the table in the target database comprises performing a snapshot apply to the target database using adaptive apply.

7. The method of claim 1, further comprising notifying a user that the database transaction qualifies as a long transaction based on the confirming.

8. The method of claim 7, further comprising notifying the user that the table in the target database has been updated based on the database transaction.

9. A computer program product comprising:

one or more computer-readable storage media; and program instructions stored on the one or more computer-readable storage media to perform operations comprising:

detecting, using a first thread associated with a first change data capture (CDC) replication mode, that a database transaction associated with a source database exceeds a threshold time value;

based on the detecting, spawning a second thread that is configured to identify log entries associated with the database transaction;

confirming the database transaction qualifies as a long transaction based on a commit operation in the log entries associated with the database transaction;

based on the confirming, switching to a second replication mode for a table associated with the database transaction;

updating the table in a target database using values obtained by executing queries on the source database, the values being identified based on operations in the log entries associated with the database transaction; and based on the updating the table in the target database, terminating the second thread and switching back to the first CDC replication mode for the table.

10. The computer program product of claim 9, wherein:

the first CDC replication mode is a normal apply mode;

the second replication mode is an adaptive apply mode;

the first thread is a log reader thread configured to run as part of a shared scrape process for plural database transactions; and the second thread is an accelerated log scanner thread configured to run as part of a private scrape process for the database transaction that is one of the plural database transactions.

11. The computer program product of claim 9, wherein the second thread is configured to identify the log entries associated with the database transaction based on a transaction identifier included in the log entries.

12. The computer program product of claim 9, further comprising forming the queries based on key column values determined from the log entries associated with the database transaction.

13. The computer program product of claim 9, wherein the updating the table in the target database comprises performing a snapshot apply to the target database using adaptive apply.

14. The computer program product of claim 9, further comprising:

notifying a user that the database transaction qualifies as a long transaction based on the confirming; and notifying the user that the table in the target database has been updated based on the database transaction.

15. A computer system comprising:

a processor set;

one or more computer-readable storage media; and program instructions stored on the one or more computer-readable storage media to cause the processor set to perform operations comprising:

detecting, using a first thread associated with a first change data capture (CDC) replication mode, that a database transaction associated with a source database exceeds a threshold time value;

based on the detecting, spawning a second thread that is configured to identify log entries associated with the database transaction;

confirming the database transaction qualifies as a long transaction based on a commit operation in the log entries associated with the database transaction;

based on the confirming, switching to a second replication mode for a table associated with the database transaction;

updating the table in a target database using values obtained by executing queries on the source database, the values being identified based on operations in the log entries associated with the database transaction; and based on the updating the table in the target database, terminating the second thread and switching back to the first CDC replication mode for the table.

16. The computer system of claim 15, wherein:

the first CDC replication mode is a normal apply mode;

the second replication mode is an adaptive apply mode;

the first thread is a log reader thread configured to run as part of a shared scrape process for plural database transactions; and the second thread is an accelerated log scanner thread configured to run as part of a private scrape process for the database transaction that is one of the plural database transactions.

17. The computer system of claim 15, wherein the second thread is configured to identify the log entries associated with the database transaction based on a transaction identifier included in the log entries.

18. The computer system of claim 15, further comprising forming the queries based on key column values determined from the log entries associated with the database transaction.

19. The computer system of claim 15, wherein the updating the table in the target database comprises performing a snapshot apply to the target database using adaptive apply.

20. The computer system of claim 15, further comprising:

notifying a user that the database transaction qualifies as a long transaction based on the confirming; and notifying the user that the table in the target database has been updated based on the database transaction.

* * * * *